Sept. 20, 1966  P. O. SKOOG  3,273,614
METHOD AND MEANS FOR PATCHING ASSEMBLED PLYWOOD PANELS
Filed June 27, 1961  10 Sheets-Sheet 1

FIG—1

PER OLOF SKOOG
*INVENTOR.*

BY
*Clarence M Tuck*

ATTORNEY

Sept. 20, 1966    P. O. SKOOG    3,273,614
METHOD AND MEANS FOR PATCHING ASSEMBLED PLYWOOD PANELS
Filed June 27, 1961    10 Sheets-Sheet 4

PER OLOF SKOOG
*INVENTOR.*

BY Clarence M. Tuck

*ATTORNEY*

Sept. 20, 1966 P. O. SKOOG 3,273,614
METHOD AND MEANS FOR PATCHING ASSEMBLED PLYWOOD PANELS
Filed June 27, 1961 10 Sheets-Sheet 6

PER OLOF SKOOG
INVENTOR.

BY *Clarence W. Tuck*

ATTORNEY

Sept. 20, 1966  P. O. SKOOG  3,273,614
METHOD AND MEANS FOR PATCHING ASSEMBLED PLYWOOD PANELS
Filed June 27, 1961  10 Sheets-Sheet 7

FIG___16

FIG___17

FIG___19

FIG___18

PER OLOF SKOOG
*INVENTOR.*

BY
*Clarence M. Tuck*
ATTORNEY

Sept. 20, 1966 P. O. SKOOG 3,273,614
METHOD AND MEANS FOR PATCHING ASSEMBLED PLYWOOD PANELS
Filed June 27, 1961 10 Sheets-Sheet 10

FIG—22

PER OLOF SKOOG
INVENTOR.

BY
ATTORNEY

United States Patent Office 3,273,614
Patented Sept. 20, 1966

3,273,614
METHOD AND MEANS FOR PATCHING
ASSEMBLED PLYWOOD PANELS
Per Olof Skoog, P.O. Box 102, Olympia, Wash.
Filed June 27, 1961, Ser. No. 119,978
17 Claims. (Cl. 144—310)

This present invention relates to the general art of patching plywood and more especially to a method and means for precisely routing out of the outer surface of a plywood panel, an area of predetermined size and shape, including a defect, and gluing in place thereof a precision cut patch in the same sequence of operations.

As the supply of clear peeler logs becomes more scarce the plywood industry has been required to patch the face coverings of plywood panels so as to remove small knots, blemishes and other defective portions and to replace these portions with a wood patch which is glued in place and which, being of the same general type and quality of veneer, normally gives an excellent surface for the finished panel. Such a patch, when smoothly sanded, provides an excellent base for any opaque finish, and one wherein the patched portion will retain the same characteristics as the balance of the panel throughout its life so that the surface covering will never be disturbed or damaged. However, the patching of the veneer prior to incorporating it into a plywood panel has certain inherent disadvantages which it has been felt, could be eliminated if the repair or patching was accomplished after the panel has been assembled and the gluing completed to form a finished panel. This present invention provides a method and means for repairing the finished panels, thus making it possible to upgrade plywood panels that may have been made up for some time.

A principal object, therefore, is to provide a method and means to implement the method for patching the surface plys of made-up plywood panels.

A further object is to provide a machine having a high speed operational sequence comprising cutting a patch from veneer stock, routing out an opening of a size and shape to precisely accept the patch, applying glue to the patch and finally inserting the patch under pressure into the routed out opening.

A further object is to rout out a hole in one surface of a plywood panel and at the same time to cut a patch of veneer to precisely fit the hole.

A further object is to provide means for securing a die cut patch to the punch die, to have the die carry the patch across a glue applying means and to seat the patch in an opening previously made, under pressure provided by the die punch means.

A further object is to provide a turret capable of partial rotation and having precise stop means at each end of its movement to provide two precise positions for use.

A further object is to provide a method and means for patching the surface material of a board or panel made of wood or other plants.

Further objects, advantages and capabilities will be apparent from the disclosure in the drawings or may be comprehended or are inherent in the device.

Referring to the drawings, throughout which like reference characters indicate like parts, the numeral 1 designates generally the main frame of my wood panel patching machine. This machine is capable of patching any form of panel in which clean openings or recesses can be made by a router cutter. Primarily, this machine is intended for the patching of assembled plywood panels in which defects have been discovered after panels have been finished or, as quite often happens, when it is desirable to upgrade the panel for certain types of more important use commanding a higher price. In many cases it is possible to materially improve the selling price of the panel by cutting out the defective portions and inserting a glued-in patch which will then make it possible to uniformly finish the entire panel surface. Patches of this type can of course also be put in solid lumber or in many of the glued-together or pressed-together boards.

As this device is intended for handling panels that are normally four feet wide, it is necessary that the frame of the machine be provided with an adequate throat or frame opening 2 so that as the panel is being patched the operator can be close to the patching operation to observe closely and to position the defect accurately for removal and patching. The throat opening preferably is provided with a built-up panel support rest member 3 so as to adequately support the panel around the point where pressure is applied. It is essential that the panels do not move during a sequence of operations which compromises; routing out a defect, making a patch of the exact size to fit the routed out portion, applying adhesive to the under side of the patch, and finally seating the patch under pressure in the routed out opening. To insure that there will be no movement of the panel a hold-down means is provided and generally referred to by numeral 4. This means is provided with two levers 5, one on each side of the machine, which are pivoted on a common axis 7 and actuated by fluid cylinders 9, as will be noted in FIGURE 1. These levers are generously proportioned so that adequate pressure can be applied at and near the spot being worked so as to adequately hold the entire panel against movement. The actual hold-down devices 4a are pivoted at 10 so that there will be a flat engagement with the panel on each side of the defect to be removed and thus the means 4 will be able to hold the panel securely.

Figure 1:
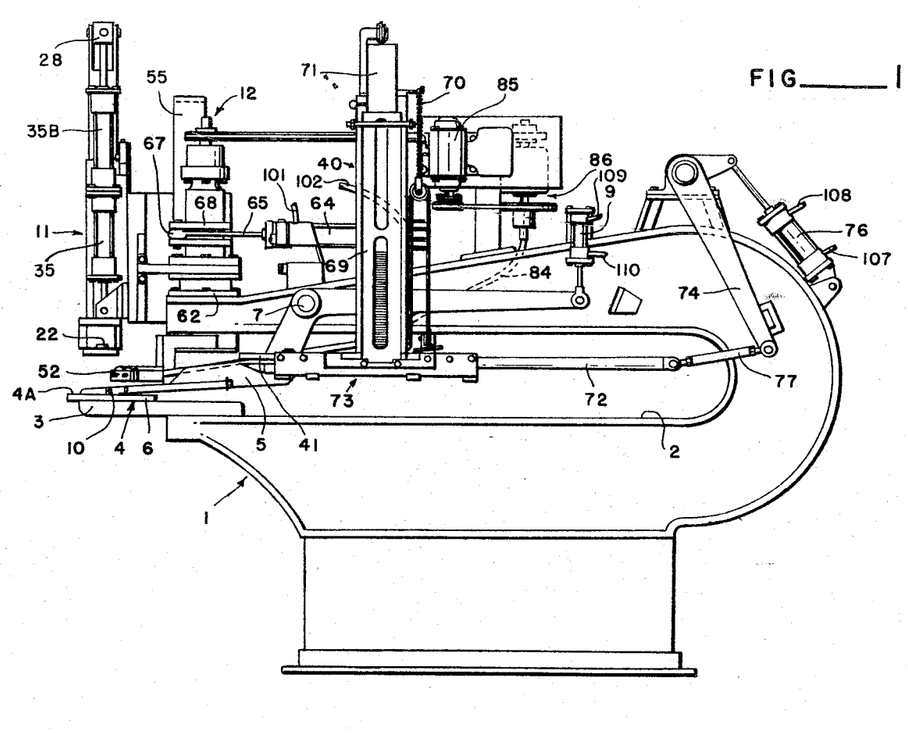
FIGURE 1 is a side elevation of my patching means for plywood panels, taken as viewed from the right hand side of the machine.
Figure 2:
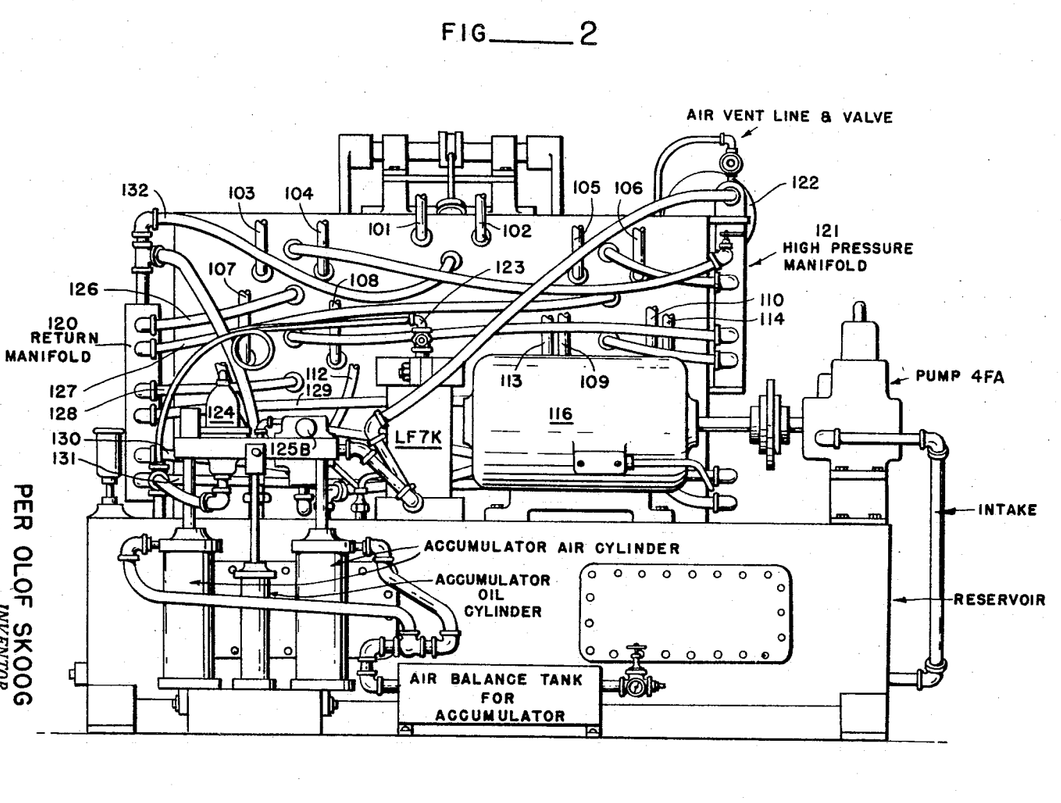
FIGURE 2 is a rear elevation of FIGURE 1 showing the fluid lines used in actuating the various parts of this present equipment.
Figure 8:
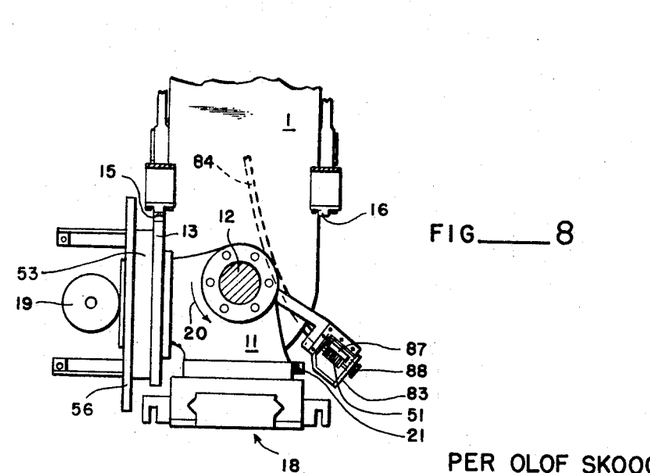
FIGURE 8 is a top plan view, partly in section, of the oscillating patching head assembly in the patch inserting position and showing particularly the pivot for the machine assembly and the rotational stops provided to accurately position the patching assembly for certain operations requiring accurate positioning.

Disposed generally above the hold-down means is the main patching head indicated generally at 11. The patching head or turret is disposed for partial revolution about a vertical pivot 12. This is shown in FIGURE 1 and shown more clearly in FIGURE 8. It will be noted in FIGURE 8 that the main head is provided with a stop plate 13 which also serves as a mounting base for the router assembly, and which is disposed to alternately engage the fixedly mounted stops 15 and 16. The purpose of these two stops is to provide for the very accurate angular positioning of the main head 11. In the position shown in FIGURE 8, the patching assembly, indicated generally by the reference numeral 18, is in the patch inserting position over the opening previously cut out by the high speed router 19. When the patching head is revolved in the direction of the arrow 20, the edged portion 21 of main head 11 will engage stop 16, placing the router in the position shown to be occupied by the patching assembly 18, and with the patching assembly revolved 90 degrees in the direction of the arrow to the position where it cuts the patch to fit the hole that is being routed out. The sequence of the operations of patch making will probably be best understood by a study of FIGURES 9, 10, 11, 12 and 13, which are fragmentary and diagrammatic in form, but still give the general proportions and relative size of the parts involved.

Figures 3, 4:
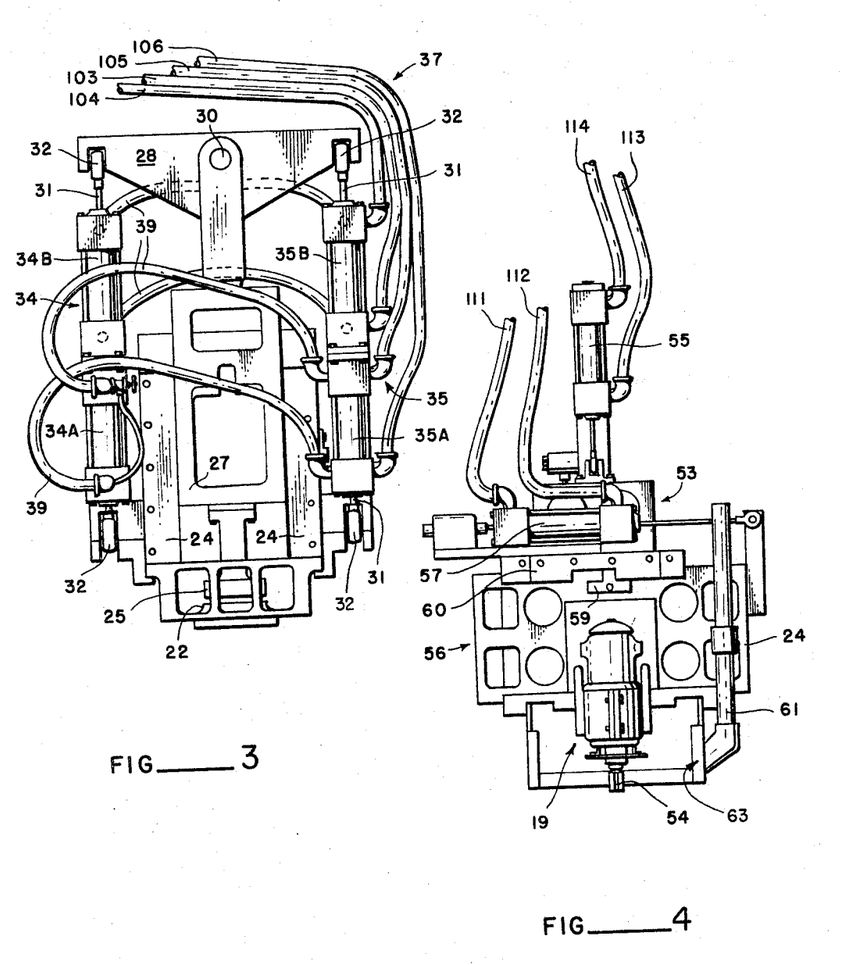
FIGURE 3 is an elevation of the pivoted patch making assembly and particularly illustrating the patch punch and patch die associated therewith, together with fluid cylinders for operation of the same.
FIGURE 4 is another view taken at 90 degrees from FIGURE 3 and showing the router means in elevation and its support, guiding and actuating means.
Figure 5:
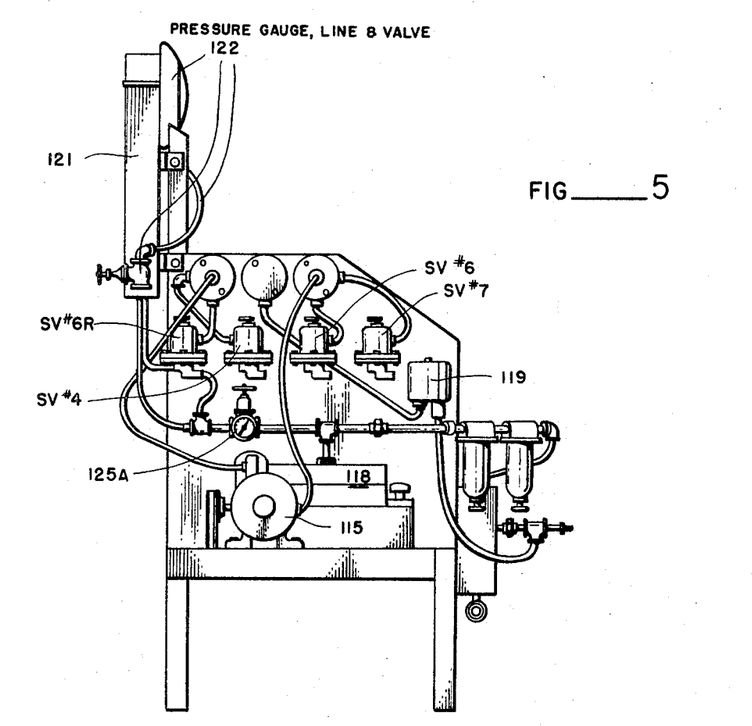
FIGURE 5 is an elevation showing the master valve control panel employed in the fluid actuation of this equipment.

The operation parts are shown in greater detail in FIGURES 1 and 3 where it will be observed that patch die 22 is secured in the framework 24 which is capable only of movement of 90 degrees around pivot 12. The coacting plug punch 25 is secured to a movable or vertically reciprocating framework 27 which is suitably guided in framework 24. An upward extension of the reciprocating framework is preferably bifurcated to engage an equalizing beam 28 which is capable of limited rotary movement about pivot 30. The opposite ends of beam 28 are connected to piston rods 31 by conventional ball type connectors 32 which give a limited universal action, thus preventing any binding should one cylinder tend to move faster or slower than the other. The lower end of cylinder assemblies 34 and 35 are connected also by ball type connectors 31 to the fixed framework 24. Each piston and cylinder assembly, designated generally by 34 and 35 consists of two axially aligned cylinder and piston assemblies 34a, 34b, 35a, and 35b and it is for this reason that there are four fluid lines leading to this assembly, indicated generally at 37 as each cylinder has a fluid supply line and a fluid return line, the arrangement of which is believed to be apparent from a study of FIGURE 3. It is necessary that cylinder assemblies 34 and 35 work at the same time and in the same direction so that substantially equal strain will be placed upon equalizing beam 28 and because of the width of the assembly it is found best to apply the reciprocating effort on each side as shown. The cross-over fluid lines 39 are a satisfactory solution of this problem. The type of fluid lines used throughout this equipment is subject to considerable variation. Hydraulic lines provide the most positive action next to mechanical or electrical means which could be used. Unless they have a fair cross-sectional area oil lines tend to introduce considerable fluid friction and to slow down the operation of certain parts. It has been found that where high speed operation is required air lines may be used with a very appreciable gain in speed of operation if the elasticity of the air is not objectionable.

Figures 9, 10:
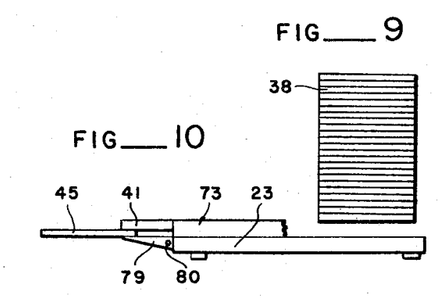
FIGURE 9 illustrates the manner in which the patch blanks are stacked in the patch blank magazine.
FIGURE 10 illustrates one method of feeding individual patch blanks to the patch die. The view is fragmentary in form.
Figures 11, 12:
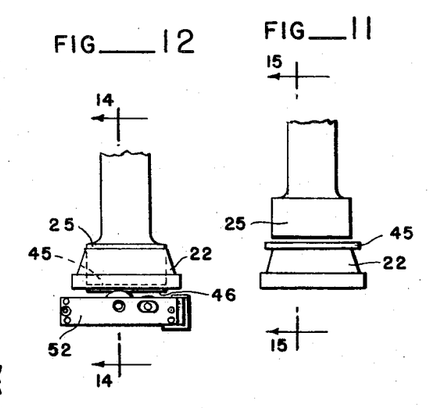
FIGURE 11 is a fragmentary view showing the general shape of the patch punch and the patch die with a patch blank in place.
FIGURE 12 illustrates an intermediate operation of coating the under side of the patch with glue.
Figure 13:
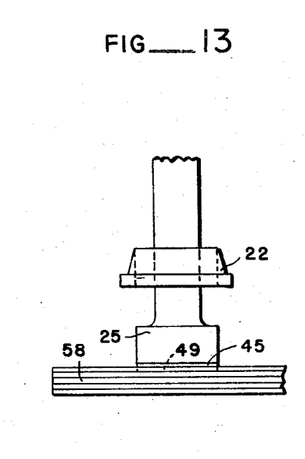
FIGURE 13 illustrates the manner in which the patch is carried on the die assembly and pressure seated in a patch opening previously routed out.
Figure 14:
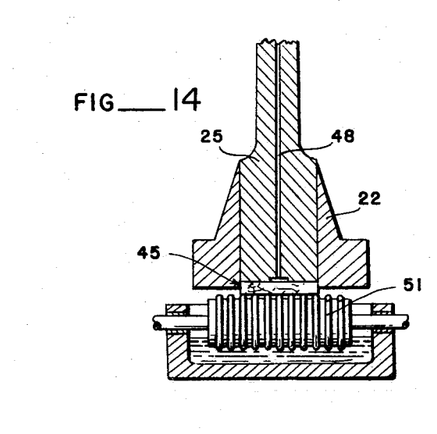
FIGURE 14 is a view in elevation and partly in section, showing the method of coating the under side of the patch with glue.
Figure 15:
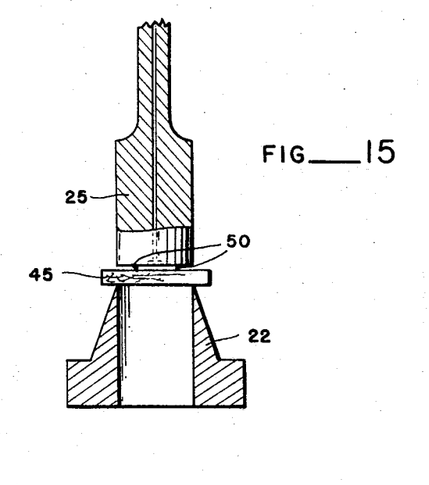
FIGURE 15 is a view similar to FIGURE 11 but showing the patch die in section and illustrating the vacuum line which provides a preferred method of holding the patch once it is cut to size, so that it may be carried forward through the operations until it is seated. A plurality of steel points are shown to optionally assist in positioning the patch blank.
Figure 17:
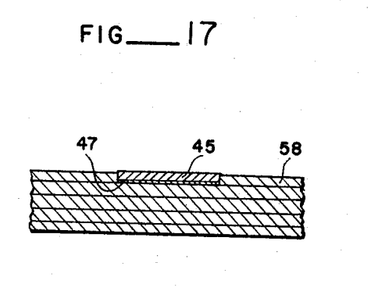
FIGURE 17 is a cross-sectional view taken along the line 17—17 of FIGURE 16 and showing the patch, the glue line and the material to be patched in section.
Figure 18:
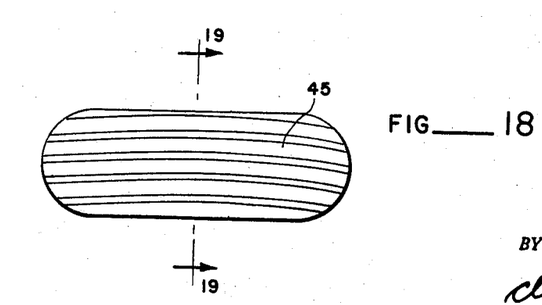
FIGURE 18 is a bottom face view of a patch after passing over the glue applicator and illustrating the ridged pattern of glue.
Figure 19:
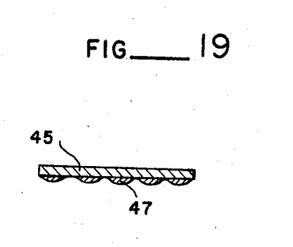
FIGURE 19 is a cross-sectional view taken along the line 19—19 of FIGURE 18 and showing the manner in which the glue is applied.

Referring to FIGURE 9, a plurality of patch blanks are stacked in the patch blank magazine 40 as shown in FIGURE 1, the operation of which will be explained later. A patch blank is stripped from the magazine by the patch blank shuttle 72, shown in FIGURE 1, and moved to the position of use where it is positioned on the patch die 22. The patch is cut by the coaction of patch die 22 and patch plug 25 moved downwardly by the reciprocating fluid cylinders 35a and 34a. The patch 45 is preferably driven downwardly so that it extends for a portion of its thickness below the bottom of patch die 22 as is indicated at 46 in FIGURE 12. A preferred arrangement of holding the patch 45 in accurate peripheral engagement with plug punch 25 is by suction which is supplied by the vacuum line 48. (FIG. 14). For certain usage a plurality of steel pointed pins or needles 50 may be employed in the manner illustrated in FIGURE 15. The patching head 11 is now revolved in the direction of the patch seating position as shown in FIGURE 13. However, intermediate the cutting of the patch and the seating of the patch it is carried over a glue applying roll 51, the action of which will be explained later. As the rotation of the patching head is completed, stop 21 has been moved from contact with stop 16 and stop 13 is contacting stop 15, which is the position of the patching head assembly 11 shown in FIGURES 8 and 13 in which the patch is now accurately positioned over the recess 49 which, on the defect removal phase of the cycle was cut in panel 58 by router 19. The stop plate 13 is now in contact with stop 15 and fluid under pressure is introduced into the patch inserting cylinders at 34b and 35b and seats the patch in recess 49. Seating requires a considerable pressure which is supplied by the pressure lines of group 37 to insure the seating and bonding of the patch, the adhesive 47, shown in FIGURE 17 and the material being patched. To re-cap this operation, the lower piston and cylinder assemblies 34a and 35a cut the patch by forcing the patch down through the cutting die 22 by plug patch punch 25. This relationship of these two parts is shown in FIGURE 12 and this arrangement is maintained until the patch is coated with glue and moved to the seating position as shown in FIGURE 13. It is necessary that additional pressure be applied to the patch punch 25, which now becomes the seating punch, and is now moved down through the cuting die 22. This additional movement is supplied by the upper patch inserting cylinders 34b and 35b. When the patch is seated the main patching head 11 is revolved counter-clockwise around its vertical pivot 12 until stop 21 of head 11 engages stop 16 and the cycle is repeated.

Figure 16:
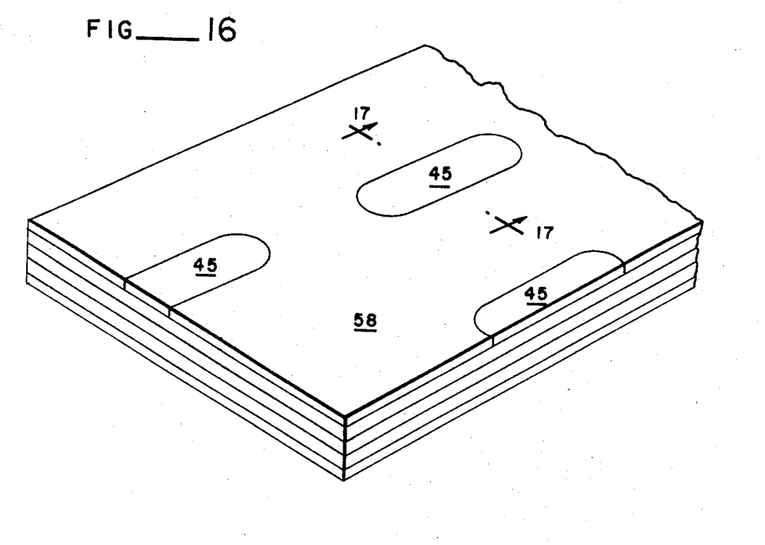
FIGURE 16 illustrates a portion of a plywood panel in which a plurality of patches have been seated.

During the time stop 21 engages stop 16, router 19, part of the defect removing assembly shown in FIGURE 4, is routing out a new defect which is to be filled with a new patch. The router mechanism is adapted to cut patches of various sizes by changing the router bit 54 and the length of its horizontal movement. The width of the patch recess will be the same as the effective diameter of the router and this diameter can be selected in keeping with the apparent patching need. A satisfactory proportion for most patching is shown in FIGURE 16. However, the length of the patch is again a matter of the selection of the length most appropriate for a given patching operation. The router is mounted for vertical and transverse movement. A vertical guide plate 53 (FIG. 4) is provided for the router assembly 19 and this is reciprocated by the fluid cylinder 55. Disposed upon the vertical guide is the horizontal guide plate 56 on which the router is mounted and transverse movement is effected by the transverse cylinder 57. In order to have an adequate length for each of the recesses so that the patch which are die cut will accurately fit the recesses 49, a transverse limit stop 59 is provided which is secured to the horizontal guide 56. A removable guide and transverse horizontal stop plate 60 is secured to vertical guide plate 53. Stop 59 coacts with stop plate 60 to determine the length of the patch recess 49. A change in the length of the recess can thus be affected by changing stop plate 60.

A sawdust suction and conveying line 61 has an intake 63 positioned adjacent the cutter so as to clean the recess made by the cutter for the reception of the patch that is to be glued therein.

The main patching head assembly 11, which is mounted for partial revolution around pivot 12, is pivotally supported by bearings enclosed within housing 62, not illustrated, as this form of structure may take on any one of several forms and is believed to be sufficiently well known. The 90 degree rotation of the patching head assembly 11 is effected by piston 64 which is suitably mounted and provided with a piston rod 65 and is connected by the universal action connector 67 to an outwardly extending bifurcated lever 68, as shown in FIGURE 1.

The patch blank magazine 40 is provided with a snap-on cover 69 and a dead weight patch follower 71 so as to insure a proper presentation of the patch blanks 38 at the bottom of the magazine where the patch can be engaged by the patch blank shuttle 72. Referring to FIGURE 1, a shuttle arrangement 72 is provided which moves inside of a shuttle guide 73. The shuttle is reciprocated by lever 74 operated by the shuttle drive fluid cylinder 76 so as to move the shuttle forward and back. An adjustable connector 77 is employed between the shuttle and the shuttle lever 74. The shuttle strips a blank from the bottom of the magazine 40 and carries it to the position where it is deposited on the cutting die as shown in FIGURE 11. It will be noted in FIGURE 10 that the patch 45 is engaged by the patch blank carrier near the ends of the shuttle stroke, thus supporting the patch until the end of the shuttle stroke is reached. The position can be adjusted by member 77. The patch blank support member 79 (FIG. 9) pivoting upon pin 80, is beyond the end of shuttle guide 73. It carries the patch until it is over the cutting die, then drops it down, leaving it in place on the cutting die. After the patch is cut by the coaction of patch die 22 and patch plug 25 the shuttle is then retracted by cylinder 76 through the operating linkage.

Figure 6:
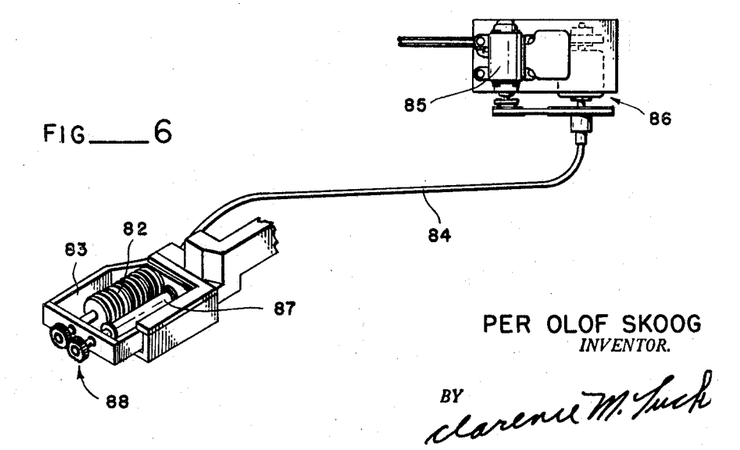
FIGURE 6 illustrates one form of glue applicator, its flexible shaft drive and its driving motor, together with its synchronizing means and with the motor assembly shown as removed from its normal position on top of the main framework.
Figure 7:
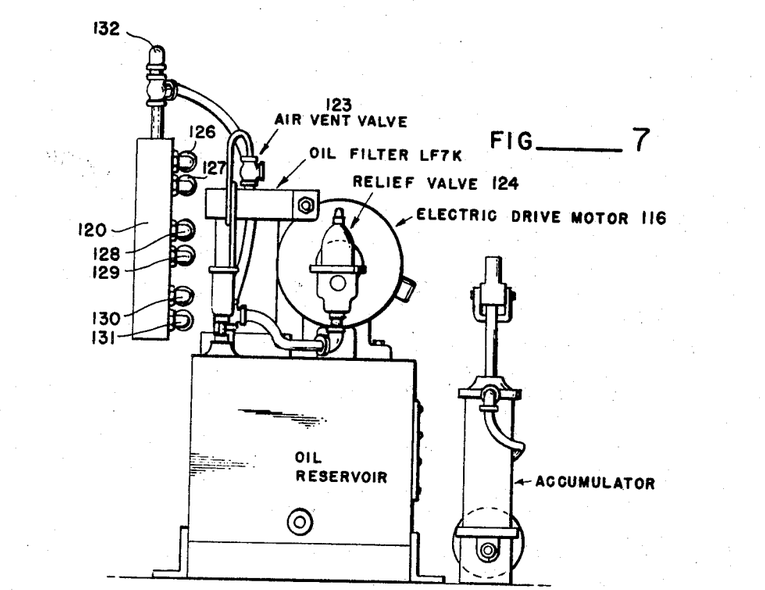
FIGURE 7 illustrates, in elevation and in fragmentary form, the electric drive motor, the compressed air and certain of the hydraulic equipment.

Referring to FIGURE 6, one type of glue applicator is illustrated consisting of a grooved roller 82 revolvably mounted in a glue reservoir 83. This is driven by a flexible shaft 84 by motor 85 driving through reduction gear and synchronizing means 86. A variably positioned glue spreading roller 87 is mounted parallel to roller 82 and drive means 88 is provided to revolve the same.

Various wood, particle boards, and other materials to be patched often require adhesives which require special treatment. In all instances it is desirable to employ an adhesive that will hold the patch in place until the adhesive sets. Such materials include catalystic type glues where it may be desirable to spray or coat each engaging surface of the patch and recess before inserting the patch and in some instances a pressure or heat setting adhesive is desirable.

*Fluid line number code*

| | Control |
|---|---|
| 109—Hold down panel clamp return | Valve #1. |
| 110—Hold down panel clamp | |
| 113—Router vertical movement up | Valve #2. |
| 114—Router vertical movement down | |
| 111—Router horizontal movement return | Valve #3. |
| 112—Router horizontal movement cut | |
| 107—Feed patch blank return (shuttle) | Valve #4. |
| 108—Feed patch blank (shuttle in) | |
| 105—Cut plug return (up) | Valve #5. |
| 106—Cut plug (down) | |
| 101—Rotate return is under pressure when machine is at neutral | Valve #6. |
| 102—Rotate operate | |
| 103—Insert plug in panel return (up) | Valve #7. |
| 104—Insert plug in panel operate (in) | |

116—5 H.P. electric motor.
117—Master valve clutch solenoid.
118—Master valve.
119—Pressure safety switch (250 p.s.i. circuit).
120—Exhaust manifold main valve panel.
121—High pressure manifold main valve panel.
122—Pressure gauge.
123—Air vent valve.
124—Pressure relief valve (500 p.s.i. circuit).
125A—Pressure reducing valve (250 p.s.i.).
125B—Pressure reducing valve (125 p.s.i.).
126—Valve return line (valve #7—patch plug in).
127—Valve return line (valve #5—patch plug cut).
128—Valve return line (valve #4—shuttle).
129—Valve return line (valve #1—hold down).
130—Valve return line (valve #3—router cut).
131—Valve return line (valve #2—router down).
132—Valve return line (valve #6—rotate).

It is to be recognized that in any involved sequential operation there is usually a considerable range of means by which the actuating energy can be applied. The exemplary showing in the accompanying table and drawings illustrates a very satisfactory means for operating the various elements, some of which require considerable power to complete the movement or operation within a desirable minimum time. As an example, there are certain operations where the application of several horse power for a brief period is required. For such needs a hydraulic fluid means, where high pressures can be utilized, results in small diameter cylinders and fluid lines and is indicated as more desirable than a mechanical means driven by an electric motor directly or an air actuated means where the use of expensive solenoid operated air valves and high pressure air compressor, together with relatively large diameter hoses, often results in a clumsy, expensive arrangement.

Figure 20:
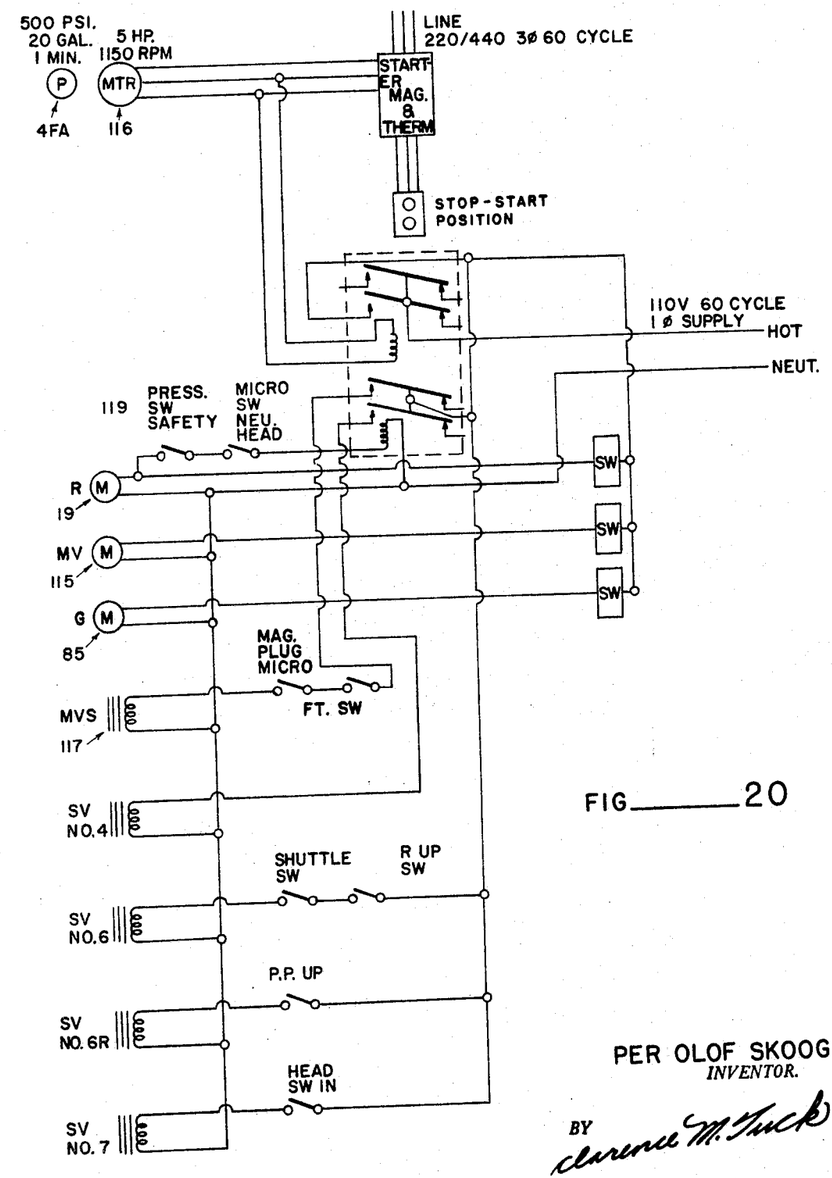
FIGURE 20 is a diagrammatic view showing the electrical installation required or preferred for certain of the actuating means.
Figure 21:
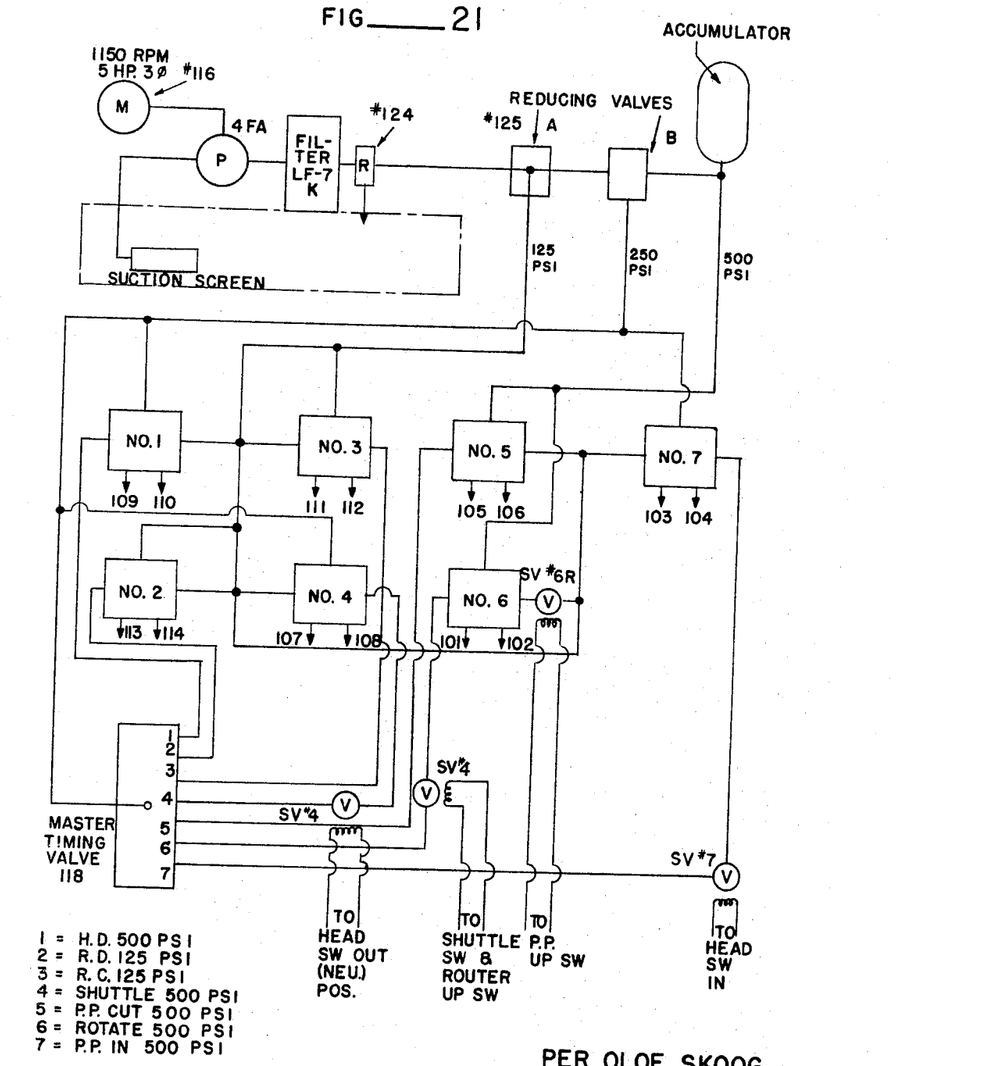
FIGURE 21 is a diagrammatic view of the hydraulic circuits as arranged for use with hydraulic pilot valves.
Figure 22:
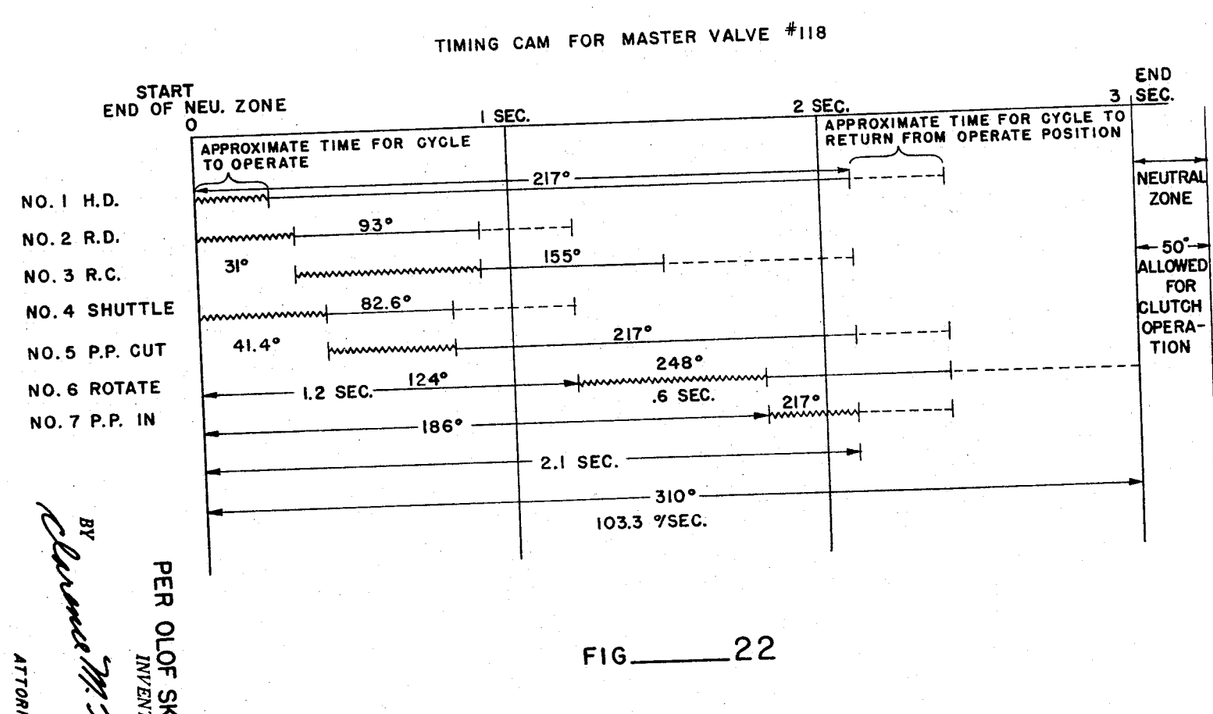
FIGURE 22 shows the timing detail which is based on a theoretical three second cycle.

In this present example the essential elements are shown in tabular form and applied to the various diagrams as FIGURES 20, 21 and 22. The same reference characters are also applied to FIGURES 2, 3, 4, 5, 7 and 8 so that the arrangement of these parts can be generally understood. The exact design characteristics of the elements listed will, in a new design, need to be balanced to conform to the operational characteristics and cycle timing requirements.

It is believed that it will be clearly apparent from the above description and the disclosure in the drawings that the invention comprehends a novel construction of a method and means for patching assembled plywood panels.

Having thus disclosed my invention, I claim:

1. Patching apparatus comprising, (1) a patching apparatus supporting frame, said supporting frame being disposed in predetermined spaced relation above a table support for building material to be patched, (2) means to retain said building material in a fixed position upon said table support, (3) router means for routing out at a predetermined position a recess of controlled size in the upper portion of said building material, (4) means to move said routing means away from said predetermined position, and (5) patching means movable horizontally to and away from said predetermined position, said patching means comprising a vertically movable plug punch having vacuum means for retaining a patch upon the lower end thereof, a vertically relatively immovable patch cutting die having its cutting surface at the upper end thereof and having its interior portion open and coaxially aligned with and dimensioned to receive said plug punch therethrough, said plug punch forming a properly sized patch by moving downwardly through patch blank material delivered to said upper end of said die and forcing said patch through said die, and (6) feeder means for delivering patch blank material to said upper end of said die.

2. Patching apparatus comprising, (1) a patching apparatus supporting frame, said supporting frame being disposed in predetermined spaced relation above a table support for building material to be patched, (2) means to retain said building material in a fixed position upon said table support, (3) router means for routing out at a predetermined position a recess of controlled size in the upper portion of said building material, (4) means to move said routing means away from said predetermined position, (5) patching means movable horizontally to and away from said predetermined position, said patching means comprising a vertically movable plug punch having means for retaining a patch upon the lower end thereof, a vertically relatively immovable patch cutting die having its cutting surface at the upper end thereof, and means to raise said plug punch above said cutting die for reception of a patch blank on the upper end of said cutting die, (6) means to supply patching blank material between said plug punch and said cutting die, and (7) adhesive applying means interposed between said patch cutting position and said predetermined position for applying adhesive to the undersurface of said patch as the same is carried to said predetermined position by said plug punch.

3. A building material patching apparatus, comprising: (1) an apparatus supporting frame disposed in predetermined spaced relation above a support means for material to be patched, (2) holding means to retain said building material in a fixed position upon said support means to present a predetermined area for patching to said apparatus, (3) router means forming one part of said apparatus and including actuating means for moving said router means to said predetermined area and routing out a recess in said predetermined area, said actuating means also being designed to move said router away from said predetermined area, (4) patching means forming another part of said apparatus and being generally horizontally movable and including a relatively vertically immovable patch cutting die and a generally vertically reciprocating plug punch to coact with said die for forming a patch, (5) feeding means for presenting patch material to the upper side of said die, (6) retaining means on the lower end of said plug punch for retaining a patch thereon after said plug punch has coacted with said die to form said patch, (7) said actuating means being designed to move said patching means over said predetermined area for delivery of said patch by said plug punch to said recess when said router is moved away.

4. A building material patching apparatus, comprising: (1) an apparatus supporting frame disposed in predetermined spaced relation above a support means for material to be patched, (2) holding means to retain said building material in a fixed position upon said support means to present a predetermined area for patching to said apparatus, (3) router means forming one part of said apparatus and including actuating means for moving said router means to said predetermined area and routing out a recess in said predetermined area, said actuating means also being designed to move said router away from predetermined area, (4) patching means having a patch forming and a patch placing position and comprising another part of said apparatus and being generally horizontally movable and including a relatively vertically immovable patch cutting die and a generally vertically reciprocating plug punch to coact with said die for forming a patch, (5) feeding means for presenting patch material to the upper side of said die, (6) retaining means on the lower end of said plug punch for retaining a patch thereon after said plug punch has coacted with said die to form said patch, (7) said actuating means being designed to move said patching means over said predetermined area for delivery of said patch to said recess by said plug punch when said router is moved away, and (8) adhesive applying means interposed between said patch forming position and said patch placing position for application of adhesive to the underside of said patch while retained on the lower end of said plug punch.

5. A building material patching apparatus, comprising: (1) an apparatus supporting frame disposed in predetermined spaced relation above a support means for material to be patched, (2) holding means to retain said building material in a fixed position upon said support means to present a predetermined area for patching to said apparatus, (3) router means forming one part of said apparatus and including actuating means for moving said router means to said predetermined area and routing out a recess in said predetermined area, said actuating means also being designed to move said router away from said predetermined area, (4) patching means having a patch forming and a patch placing position and comprising another part of said apparatus and being generally horizontally movable and including a relatively vertically immovable female patch cutting die with its cutting edge on the upper side and a generally vertically reciprocating male plug punch to move through and to coact with said die for forming a patch, (5) feeding means for presenting patch material to the upper side of said die, (6) retaining means on the lower end of said plug punch for retaining a patch thereon after said plug punch has coacted with said die to form said patch, and (7) said actuating means being designed to move said patching means over said predetermined area for delivery of said patch to said recess when said router is moved away.

6. A building material patching apparatus, comprising: (1) an apparatus supporting frame disposed in predetermined spaced relation above a support means for material to be patched, (2) holding means to retain said building material in a fixed position upon said support means to present a predetermined area for patching to said apparatus, (3) router means forming one part of said apparatus and including first actuating means for moving said router means to said predetermined area and routing out a recess in said predetermined area, said first actuating means also being designed to move said router away from said predetermined area, (4) patching means having a patch forming and a patch placing position and comprising another part of said apparatus and being generally horizontally movable and including a relatively vertically immovable female patch cutting die with its cutting edge on the upper side and a generally vertically reciprocating male plug punch to move through and to coact with said die for forming a patch, (5) feeding means for presenting patch material to the upper side of said die, (6) retaining means on the lower end of said plug punch for retaining a patch thereon after said plug punch has coacted with said die to form said patch, (7) said patching means over said predetermined area for delivery of said patch to said recess when said router is moved away, and (8) said plug punch having an intermediate patch forming movement for coacting with said die and a second patch placing movement for delivering said patch to said recess.

7. A building material patching apparatus, comprising: (1) an apparatus supporting frame disposed in predetermined spaced relation above a support means for material to be patched, (2) holding means to retain said building material in a fixed position upon said support means to present a predetermined area for patching to said apparatus, (3) router means forming one part of said apparatus and including actuating means for moving said router means to said predetermined area to rout out a recess in said predetermined area, said actuating means also being designed to move said router away from said predetermined area, (4) patching means having a patch forming and a patch placing position and comprising another part of said apparatus and being generally horizontally movable and including a relatively vertically immovable patch cutting die and a generally vertically reciprocating plug punch to coact with said die for forming a patch, (5) feeding means for presenting patch material to the upper side of said die, (6) retaining means on the lower end of said plug punch for retaining a patch thereon after said plug punch had coacted with said die to form said patch, said plug punch retaining means and said die also coacting to hold said patch in an intermediate plane between said patch forming and said patch placing position and said plug punch being designed to deliver said patch to said recess when said patching means is in said patch placing position, and (7) said actuating means being designed to move said patching means over said predetermined area for delivery of said patch to said recess when said router is moved away.

8. A building material patching apparatus, comprising: (1) an apparatus supporting frame disposed in predetermined spaced relation above a support means for material to be patched, (2) holding means to retain said building material in a fixed position upon said support means to present a predetermined area for patching to said apparatus, (3) router means forming one part of said apparatus and including actuating means for moving said router means to said predetermined area to rout out a recess in said predetermined area, said actuating means also being designed to move said router away from said predetermined area, (4) patching means having a patch forming and a patch placing position and comprising another part of said apparatus and being generally horizontally movable and including a relatively vertically immovable patch cutting die and a generally vertically reciprocating plug punch to coact with said die for forming a patch, (5) feeding means for presenting patch material to the upper side of said die, (6) retaining means on the lower end of said plug punch for retaining a patch thereon after said plug punch had coacted with said die to form said patch, said plug punch retaining means and said die also coacting to hold said patch in an intermediate plane between said patch forming and said patch placing position and said plug punch being designed to deliver said patch to said recess when said patching means is in said patch placing position, (7) said actuating means being designed to move said patching means over said predetermined area for delivery of said patch to said recess when said router is moved away, and (8) adhesive applying means interposed between said patch forming position and said patch placing position for application of adhesive to the underside of said patch while being cooperatively held by said plug punch retaining means and said die.

9. A building material patching apparatus, comprising: (1) an apparatus supporting frame disposed in predetermined spaced relation above a support means for material to be patched, (2) holding means to retain said building material in a fixed position upon said support means to present a predetermined area for patching to said apparatus, (3) router means forming one part of said apparatus and including actuating means for moving said router means to said predetermined area to rout out a recess in said predetermined area, said actuating means also being designed to move said router away from said predetermined area, (4) patching means having a patch forming and a patch placing position and comprising another part of said apparatus and being generally horizontally movable and including a relatively vertically immovable female patch cutting die with its cutting edge on the upper side and a generally vertically reciprocating male plug punch to move through and to coact with said die for forming a patch, (5) feeding means for presenting patch material to the upper side of said die, (6) retaining means on the lower end of said plug punch for retaining a patch thereon after said plug punch has coacted with said die to form said patch, said plug punch retaining means and said die also coacting to hold said patch in an intermediate plane between said patch forming and said patch placing position and said plug punch being designed to deliver said patch to said recess when said patching means is in said patch placing position, and (7) said actuating means being designed to move said patching means over said predetermined area for delivery of said patch to said recess when said router is moved away.

10. A building material patching apparatus, comprising: (1) an apparatus supporting frame disposed in predetermined spaced relation above a support means for material to be patched; (2) holding means to retain said building material in a fixed position upon said support means to present a predetermined area for patching to said apparatus, (3) router means forming one part of said apparatus and including actuating means for moving said router means to said predetermined area to rout out a recess in said predetermined area, said actuating means also being designed to move said router away from said predetermined area, (4) patching means having a patch forming and a patch placing position and comprising another part of said apparatus and being generally horizontally movable and including a relatively vertically immovable female patch cutting die with its cutting edge on the upper side and a generally vertically reciprocating male plug punch to move through and to coact with said die for forming a patch, (5) feeding means for presenting patch material to the upper side of said die, (6) retaining means on the lower end of said plug punch for retaining a patch thereon after said plug punch has coacted with said die to form said patch, said plug punch retaining means and said die also coacting to hold said patch in an intermediate plane between said patch forming and said patch placing position and said plug punch being designed to deliver said patch to said recess when said patching means is in said patch placing position, (7) said actuating means being designed to move said patching means over said predetermined area for delivery of said patch to said recess when said router is moved away, and (8) adhesive applying means interposed between said patch forming position and said patch placing position for application of adhesive to the underside of said patch while being cooperatively held by said plug punch retaining means and said die.

11. A building material patching apparatus, comprising: (1) an apparatus supporting frame disposed in predetermined spaced relation above a support means for material to be patched, (2) holding means to retain said building material in a fixed position upon said support means to present a predetermined area for patching to said apparatus, (3) router means forming one part of said apparatus and including actuating means for moving said router means to said predetermined area, said actuating means also being designed to move said router away from said predetermined area, (4) patching means forming another part of said apparatus and being generally horizontally movable and including a relatively vertically immovable female patch cutting die and a generally vertically reciprocating male plug punch to coact with said die for forming a patch, (5) feeding means for presenting patch material to the upper side of said die, (6) retaining means on the lower end of said plug punch coacting with said die for retaining a patch thereon after said plug punch has coacted with said die to form said patch, (7) said actuating means being designed to move said patching means over said predetermined area for delivery of said patch by said plug punch to said recess when said router is moved away, and (8) adhesive applyiing means located so as to apply adhesive to said patch before said patch is delivered into said recess.

12. A building material patching apparatus, comprising: (1) an apparatus supporting frame disposed in predetermined spaced relation above a support means for material to be patched, (2) holding means to retain said building material in a fixed position upon said support means to present a predetermined area for patching to said apparatus, (3) router means forming one part of said apparatus and including actuating means for moving said router means to said predetermined area and routing out a recess in said predetermined area, said actuating means also being designed to move said router away from said predetermined area, (4) patching means having a patch forming and a patch placing position and comprising another part of said apparatus and being generally horizontally movable and including a relatively vertically immovable female patch cutting die and a generally vertically reciprocating male plug punch to coact with said die for forming a patch, (5) feeding means for presenting patch material to the upper side of said die, (6) retaining means on the lower end of said plug punch for retaining a patch thereon after said plug punch has coacted with said die to form said patch, (7) said actuating means being designed to move said patching means over said predetermined area for delivery of said patch by said plug punch to said recess when said router is moved away, and (8) adhesive applying means interposed between said patch forming position and said patch placing position for application of adhesive to the underside of said patch while retained on the lower end of said plug punch.

13. A building material patching apparatus, comprising: (1) an apparatus supporting frame disposed in predetermined spaced relation above a support means for material to be patched, (2) holding means to retain said building material in a fixed position upon said support means to present a predetermined area for patching to said apparatus, (3) router means forming one part of said apparatus and including actuating means for moving said router means to said predetermined area and routing out a recess in said predetermined area, said actuating means also being designed to move said router away from said predetermined area, (4) patching means having a patch forming and a patch placing position and comprising another part of said apparatus and being generally horizontally movable and including a relatively vertically immovable female patch cutting die with its cutting edge on the upper side and a generally vertically reciprocating male plug punch to move through and to coact with said die for forming a patch, (5) feeding means for presenting patch material to the upper side of said die, (6) retaining means on the lower end of said plug punch for retaining a patch thereon after said plug punch has coacted with said die to form said patch, (7) said actuating means being designed to move said patching means over said predetermined area for delivery of said patch by said plug punch to said recess when said router is moved away, and (8) adhesive applying means located so as to apply adhesive to said patch before said patch is delivered to said recess.

14. A building material patching apparatus, comprising: (1) an apparatus supporting frame disposed in predetermined spaced relation above a support means for material to be patched, (2) holding means to retain said building material in a fixed position upon said support means to present a predetermined area for patching to said apparatus, (3) router means forming one part of said apparatus and including first actuating means for moving said router means to said predetermined area and routing out a recess in said predetermined area, said first actuating means also being designed to move said router away from said predetermined area, (4) patching means having a patch forming and a patch placing position and comprising another part of said apparatus and being generally horizontally movable and including a relatively vertically immovable female patch cutting die with its cutting edge on the upper side and a generally vertically reciprocating male plug punch to move through and to coact with said die for forming a patch, (5) feeding means for presenting patch material to the upper side of said die, (6) retaining means on the lower end of said plug punch for retaining a patch thereon after said plug punch has coacted with said die to form said patch, (7) said first actuating means also being designed to move said patching means over said predetermined area for delivery of said patch to said recess when said router is moved away, (8) said plug punch having an intermediate patch forming movement for coacting with said die and a second patch placing movement for delivering said patch to said recess, and (9) adhesive applying means located so as to apply adhesive to said patch before said patch is delivered to said recess.

15. A building material patching apparatus, comprising: (1) an apparatus supporting frame disposed in predetermined spaced relation above a support means for material to be patched, (2) holding means to retain said building material in a fixed position upon said support means to present a predetermined area for patching to said apparatus, (3) router means forming one part of said apparatus and including actuating means for moving said router means to said predetermined area to rout out a recess in said predetermined area, said actuating means also being designed to move said router away from said predetermined area, (4) patching means having a patch forming and a patch placing position and comprising another part of said apparatus and being generally horizontally movable and including a relatively vertically immovable female patch cutting die and a generally vertically reciprocating male plug punch to coact with said die for forming a patch, (5) feeding means for presenting patch material to the upper side of said die, (6) retaining means on the lower end of said plug punch for retaining a patch thereon after said plug punch had coacted with said die to form said patch, said plug punch retaining means and said die also coacting to hold said patch in an intermediate plane between said patch forming and said patch placing position and said plug punch being designed to deliver said patch to said recess when said patching means is in said patch placing position, (7) said actuating means being designed to move said patching means over said predetermined area for delivery of said patch to said recess when said router is moved away, and (8) adhesive applying means located so as to apply adhesive to said patch before said patch is delivered to said recess.

16. The method of patching the surface portion of a piece of building material having a defect thereon, comprising: (1) positioning a routing means over said defect and removing said defect by routing out a recess in the outer surface of said material, (2) generally simultaneously with said routing operation forming a mating patch for said recess with a patch forming means at a point located away from but in close proximity to said routing operation, (3) upon completion of said routing and patch forming steps transferring said routing means away from and transferring said mating patch over said recess in said patch forming means so that said patch forming means also acts as a hold means for said mating patch, and (4) employing a portion of said patch forming means to deliver said patch to said recess.

17. The method of patching the surface portion of a piece of building material having a defect thereon, comprising: (1) positioning a routing means over said defect and removing said defect by routing out a recess in the outer surface of said material, (2) generally simultaneously with said routing operation forming a mating patch for said recess with a patch forming means at a point located in close proximity to said routing operation, (3) upon completion of said routing and patch forming steps transferring said routing means away from and transferring said mating patch over said recess in said patch forming means so that said patch forming means also acts as a holding means for said mating patch, (4) simultaneously with said transferring steps applying adhesive to said patch, and (5) employing a portion of said patch forming means to deliver said patch to said recess.

References Cited by the Examiner
UNITED STATES PATENTS

| | | | |
|---|---|---|---|
| 2,336,704 | 12/1943 | Skoog | 144—2 |
| 2,643,689 | 6/1953 | Sherman | 144—2 |
| 2,643,690 | 6/1953 | White | 144—2 X |
| 2,663,332 | 12/1953 | Peterson | 144—2 |
| 2,675,038 | 4/1954 | Carlson | 144—2 X |

FOREIGN PATENTS

| | | |
|---|---|---|
| 698,015 | 11/1930 | France. |
| 231,533 | 7/1944 | Switzerland. |

HAROLD D. WHITEHEAD, *Primary Examiner.*

WALTER A. SCHEEL, EARL EMSHWILLER, WILLIAM W. DYER, Jr., LESTER M. SWINGLE,
*Examiners.*